H. STRAIT.
Saw Set.
No. 8,032.
Patented April 8, 1851.
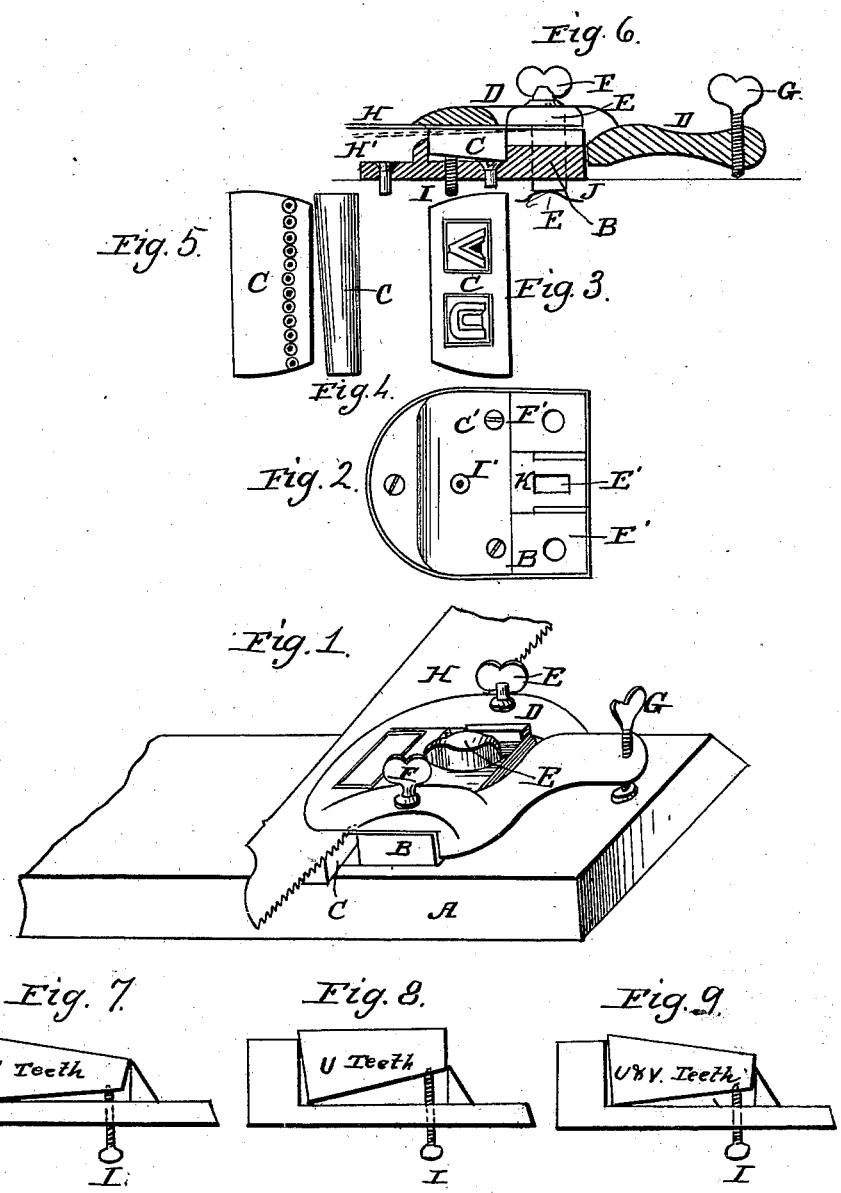

UNITED STATES PATENT OFFICE.

H. STRAIT, OF COVINGTON, KENTUCKY.

SAW-SET.

Specification of Letters Patent No. 8,032, dated April 8, 1851.

*To all whom it may concern:*

Be it known that I, HIRAM STRAIT, of Covington, Kenton county, Kentucky, have invented a new and useful Machine for Setting or Shouldering All Kinds of Saw-Teeth, which I call the "Saw-Doctor;" and I do hereby declare that the following is a full, clear, and exact description of the construction and operation of the same, reference being had to the annexed drawings, as part of the specification.

The same letters in the six first figures stand for the same parts, while in the three last the names of the parts are written in full.

Figure 1 is a perspective view of the saw-doctor, with a saw in its jaws in the act of setting or shouldering. Fig. 2 is a perspective view of the top of the under jaw. Fig. 3 shows the face of the saw-rest, on which all saws rest and are held, so as to be set, shouldered, or both. Fig. 4 shows that side of the saw rest which slides in contact with the tooth-rest and over which the saw-teeth are shouldered or set by the action of the punch. Fig. 5 shows the double beveled bottom of the saw-rest, with its series of holes or notches for the point of its adjusting screw to work in, to level or incline it. Fig. 6 shows a center section of the saw-doctor, lengthwise and the relative position and adaptation of its parts. Fig. 7 is an enlarged representation of the tooth-rest and saw-rest by cross-section and shows their adjustment for setting. Fig. 8 is the same, for shouldering, and Fig. 9 is the same, for both shouldering and setting.

In the drawings, A shows a part of the stand; B, the wall of the bed on which the tooth-rest is made and through which the punch and connection screws pass and play.

C is the saw-rest and C' its bed.

D shows the section of the upper jaw; E, the punch, and E', its socket.

F, F, show the connection thumb-screws and F', F', their passage through the under jaw.

G, shows the adjusting screw of the upper jaw; H, a saw as adjusted for shouldering and H', as adjusted for setting.

I, shows the adjusting screw of the saw-rest, and I', its place in the bed.

J, shows the spring under the punch, and K, the face of the tooth-rest.

The connection screws fasten the jaws together and to the stand, so as to hold the saw, firm in its place. The adjusting screw G, is to tighten the saw, just so as to allow its sliding motion between the jaws and the adjusting screw I, is to level or incline the face of the saw-rest and saw, as wanted, for shouldering, setting or both, to any degree. The spring J, may be steel, India-rubber or any other elastic substance.

The saw-rest is a wedge-shaped piece of metal or other hard substance, double-beveled on its underside, lengthwise, to allow its elevation, by being moved up in its bed and cross-wise, to allow its inclination, also in its bed. Its narrow sides are also slightly beveled cross-wise to allow its inclined motion and keep it always in close contact with the tooth-rest. It is beveled on all sides but its face; and its bed, lengthwise, is beveled to the same extent that it is, length-wise and may or may not be, cross-wise. By the bevel lengthwise, of the saw-rest and its bed, being the same, changing its elevation, will not change its horizontality as regards the face of the tooth-rest. The saw-rest is elevated in its bed, by pushing it up, so as to form a shoulder next to the tooth-rest, of the size wanted and a corresponding one will be formed on the saw-teeth by the punch. It is kept in its place, elevation or inclination by the adjusting screw I.

In setting saw-teeth, the points and a part of the body of the teeth, are more or less inclined outward on each side of the saw-plate and they stand inclined like the legs or arms of the letter V. Fig. 7 shows the adjustment of the saw-rest, for making V-form or set teeth. Where the faces of the tooth and saw-rest touch, they are level and the face of the saw-rest itself is inclined downward. In shouldering saw-teeth, the points and a part of the bodies of the teeth, are shouldered or more or less carried outward from the saw-plate, so as to stand, perpendicular, like the legs or arms of the Letter U. Shouldered teeth act like perpendicular and set teeth like inclined cutters. Fig. 8 shows the adjustment of the saw-rest for making U-form or shouldered teeth. The face of the saw-rest is placed horizontally, but higher than the face of the tooth-rest. In order to set and shoulder saw-teeth at the same time, all that is necessary, is to elevate the face of the saw-rest, higher than the face of the tooth-rest, by pushing it up in its bed and then inclining it as much as wanted and the punch will both shoulder and set at the same time. Fig. 9 shows the adjustment for shouldering and setting saw-teeth. Whenever the face of the saw-rest is higher than the face of the tooth-rest, the punch shoulders and whenever the face of the saw-rest is inclined, it sets and as the face of the saw-rest can be both higher and also inclined, it can both shoulder and set at the same time.

The oblong holes in the upper jaw, through which the connection screws pass, are to allow its advancing and receding over the under jaw and thus act as a tooth-gage. On each side of the punch, on the under-jaw, are two guide-flanges, made to slide in the opening of the upper jaw, to keep it from turning to either side. Sliding wedges fastened by pins or thumb-screws, may be used in place of the adjusting screws. The stand, jaws and saw rest, are all made in the form here drawn, of different sized patterns for different saws and then cast and fitted together with their connection, adjusting and other screws. The stand may be oblong or round and made of wood or metal. If cast, the stand and under jaw may be one entire piece and the other parts fitted to it. The punch is T-form and made of steel. The faces of the tooth-rest and saw-rest, should also be steel, case-hardened or chilled iron. The adjusting screws both have taper points and rest in corresponding metallic holes, notches or eyes, which are arranged in a line where they act. The long bevel of the saw-rest and its bed, is for a change of elevation and the cross-bevel is for a change of inclination. The shoulder of saw-teeth will always be in proportion to the elevation of the face of the saw-rest over the face of the tooth-rest and the set, in proportion to the inclination of the face of the saw-rest.

What I claim as of my own invention in the saw-doctor and wish to secure by Letters Patent of the United States, is—

The "adjustable double-beveled slide saw-rest," constructed and used substantially as herein described, by means of which, its beveled bed, the tooth-rest, upper jaw and punch saws of all kinds can be firmly held and their teeth be either set in V-form, shouldered in U-form or be both shouldered and set, to any amount required, to insure any degree of smoothness or roughness in sawing, whether their points are sharp or rounded.

HIRAM STRAIT.

Attest:
THOS. FRASER,
E. H. PUGH.